UNITED STATES PATENT OFFICE.

GEORGE WASHINGTON ROSS AND JAMES DEWITT ROSS, OF BOONSVILLE, TEXAS.

REMEDY FOR CHICKEN-CHOLERA.

SPECIFICATION forming part of Letters Patent No. 313,956, dated March 17, 1885.

Application filed December 19, 1884. (No specimens.)

*To all whom it may concern:*

Be it known that we, GEORGE W. ROSS and JAMES D. ROSS, of Boonsville, in the county of Wise and State of Texas, have invented certain new and useful Improvements in Chicken-Cholera Medicines; and we do hereby declare the following to be a full, clear, and exact description of the invention, such as will enable others skilled in the art to which it pertains to make and use it.

Our invention relates to an improvement in medicines for the treatment of chicken-cholera; and it consists in a compound composed of Cayenne pepper, May-apple root, and blue vitriol, which is either to be mixed in the chickens' food or to be given to them separately, and used as a preventative or as a cure, as will be more fully described hereinafter.

In mixing our medicine we take of Cayenne pepper, one ounce; May-apple root, one ounce; blue vitriol, (sulphate of copper,) one dram. These ingredients are pulverized and then mixed together, and the medicine is ready to be mixed with the cornmeal or other food for the chickens. For one dozen chickens we usually take one tea-spoonful of the medicine and mix it with a pint of cornmeal.

We are aware that the use of Cayenne pepper, May-apple, and blue vitriol are each old in remedies for the treatment of cholera in animals, and that the two first have been used together with sulphate of iron, for the same disease.

Having thus described our invention, we claim—

A medicine for the treatment of chicken-cholera, composed of Cayenne pepper, May-apple root, and blue vitriol, as described.

In testimony whereof we affix our signatures in presence of two witnesses.

GEORGE WASHINGTON ROSS.
  JAMES DEWITT ROSS.

Witnesses:
 JAMES ALEXANDER STENNIS,
 JNO. W. TYLER.